United States Patent
Bhoj

(10) Patent No.: US 8,402,295 B2
(45) Date of Patent: Mar. 19, 2013

(54) TECHNIQUES EMPLOYING FLITS FOR CLOCK GATING

(75) Inventor: Shilpa Bhoj, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 319 days.

(21) Appl. No.: 12/833,298

(22) Filed: Jul. 9, 2010

(65) Prior Publication Data
US 2012/0011383 A1  Jan. 12, 2012

(51) Int. Cl.
*G06F 1/32* (2006.01)
(52) U.S. Cl. ......... 713/330; 713/300; 713/320; 713/324
(58) Field of Classification Search .................... 713/300
See application file for complete search history.

(56) References Cited

U.S. PATENT DOCUMENTS

| | | | | |
|---|---|---|---|---|
| 7,313,712 | B2* | 12/2007 | Cherukuri et al. | 713/324 |
| 7,467,358 | B2 | 12/2008 | Kang et al. | |
| 7,610,500 | B2* | 10/2009 | Cherukuri et al. | 713/320 |
| 2005/0262368 | A1* | 11/2005 | Cherukuri et al. | 713/324 |
| 2007/0124607 | A1* | 5/2007 | Fuchs | 713/300 |
| 2008/0075107 | A1* | 3/2008 | Cherukuri et al. | 370/447 |
| 2008/0077814 | A1* | 3/2008 | Cherukuri et al. | 713/320 |
| 2008/0091963 | A1* | 4/2008 | Cherukuri et al. | 713/320 |
| 2010/0318822 | A1* | 12/2010 | Scandurra et al. | 713/322 |
| 2011/0235531 | A1* | 9/2011 | Vangal et al. | 370/252 |

FOREIGN PATENT DOCUMENTS

EP  1624620 A1  2/2006

OTHER PUBLICATIONS

Nedevschi et al.; "Reducing network energy consumption via sleeping and rate-adaptation"; Proceedings of the 5th USENIX Symposium on Networked Systems Design and Implementation; 2008; 323-336.*
Kyle C. Hale, "Segment Gating for Static Energy Reduction in Networks-On-Chip," Department of Computer Sciences, The University of Texas at Austin, NoCArc '09, Dec. 12, 2009, New York City, New York, USA, Copyright 2009 ACM 978-1-60558-774-5.
Fabien Clermidy, "A NoC-Based Communication Framework for Seamless IP Integration in Complex Systems," CEA/LETI, Grenoble, France, downloaded from D&R Industry Articles—http://www.design-reuse.com/articles/12226/a-noc-based-communication . . . .
Hiroki Matsutani, "Run-Time Power Gating of On-Chip Routers Using Look-Ahead Routing," Keio University, 3-14-1, Hiyoshi, Kohoku-ku, Yokohama, 223-8522, Japan, National Institute of Informatics, 2-1-2, Hitotsubashi, Chiyoda-ku, Tokyo, 101-8430, Japan, 978-1-4244-1922-7/08/$25.00 © 2008 IEEE.
Niket Agarwal, "Garnet: A Detailed On-Chip Network Model inside a Full-System Simulator," Department of Electrical Engineering, Princeton University, Princeton, NJ, 08544.

(Continued)

*Primary Examiner* — Ryan Stiglic
(74) *Attorney, Agent, or Firm* — Nicholas J. Pauley; Sam Talpalatsky; Jonathan T. Velasco

(57) ABSTRACT

A method includes receiving data intended for a destination and sending a power flit to the destination via a route. The power flit wakes at least one component on the route. The method also includes sending the data as a data flit to the destination via the route after sending the power flit. The power flit can include a header indicating the destination and a source of the received data. The power flit can be formed by extracting destination data from the received data.

20 Claims, 3 Drawing Sheets

OTHER PUBLICATIONS

Hiroki Matsutani et al., "Adding Slow-Silent Virtual Channels for Low-Power On-Chip Networks", Networks-On-Chip, 2008, NOCS 2008, Second ACM/IEEE International Symposium on, IEEE, Piscataway, NJ, USA, Apr. 7, 2008, pp. 23-32, XP031244542, ISBN: 978-0-7695-3098-7.

International Search Report and Written Opinion—PCT/US2011/043408, ISA/EPO—Oct. 12, 2011.

Simunic T et al., "Managing power consumption in networks on chips", IEEE Transactions on Very Large Scale Integration (VLSI) Systems, IEEE Service Center, Piscataway, NJ, USA, vol. 12, No. 1, Jan. 1, 2004, pp. 96-107, XP011325663, ISSN: 1063-8210, DOI: 10.1109/TVLSI.2003.820533.

* cited by examiner

TECHNIQUES EMPLOYING FLITS FOR CLOCK GATING

TECHNICAL FIELD

This disclosure generally relates to clock gating and, more specifically, relates to use of flits to wake components in a clock gating technique.

BACKGROUND

Clock gating is a widely used power reduction mechanism in commercial application specific integrated circuits (ASICs). By turning off sections of the clock tree, the switching power (due to capacitances on the clock tree) can be brought to zero. A network on chip (NoC) interconnect offers unique opportunities and challenges while clock gating. Unlike a bus-based interconnect, some discrete components of the NoC can remain gated off while others are on depending on traffic patterns. Additionally, resources on a traffic path can remain off until data flits reach the nodes of the path ("just-in-time gating on"). This leads to much greater power savings. However, frequent gating of components and just-in-time gating on usually leads to increased latency (up to 4-8 cycles per gating on operation at each node) and performance issues. As NoCs usually have greater latency than a traditional bus, additional latency due to aggressive clock gating would not be well tolerated in high performance latency critical implementations. Thus, the full power savings of clock gating cannot be realized in conventional NoC systems.

BRIEF SUMMARY

According to one embodiment, a method includes identifying a destination of a transaction and generating a power flit configured to wake at least one component along a route to the destination. The method also includes sending the power flit along the route to the destination before sending a data flit. The flit wakes at least one component on the route.

In another embodiment, a system includes means for receiving data intended for a destination, means for sending a power flit to the destination via a route, and means for sending the data as a data flit to the destination via the route after sending the power flit. The power flit is configured to wake components on the route.

In yet another embodiment, a computer program product is disclosed. The computer program product has a computer readable medium tangibly recording computer program logic. The computer program product includes code to receive data intended for a destination, code to send a power flit to the destination via a route, and code to send the data as a data flit to the destination via the route after sending the power flit. The power flit is configured to wake components on the route.

In still another embodiment, a system is disclosed. The system includes a Network Interface Unit (NIU) configured to receive data intended for a destination, send a power flit to the destination via a route, the power flit configured to wake components on the route, and send the data as a data flit to the destination via the route after sending the power flit.

The foregoing has outlined rather broadly the features and technical advantages of the present disclosure in order that the detailed description that follows may be better understood. Additional features and advantages will be described hereinafter which form the subject of the claims of the disclosure. It should be appreciated by those skilled in the art that the conception and specific embodiments disclosed may be readily utilized as a basis for modifying or designing other structures for carrying out the same purposes of the present disclosure. It should also be realized by those skilled in the art that such equivalent constructions do not depart from the technology of the disclosure as set forth in the appended claims. The novel features which are believed to be characteristic of the disclosure, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

For a more complete understanding of the present disclosure, reference is now made to the following description taken in conjunction with the accompanying drawings.

DETAILED DESCRIPTION

Various embodiments propose the use of a flit referred to as 'a power flit' to reduce or eliminate latency induced by clock gating. As will be described in more detail below, the power flit is sent ahead of data to wake up components along the route the data will take. Thus, the power flit absorbs latency within the network on chip (NoC). Various embodiments can be used in any kind of processor chip or chip package including, but not limited to, ASICs, general purpose processors, digital signal processors (DSPs), and the like.

Figure 1:
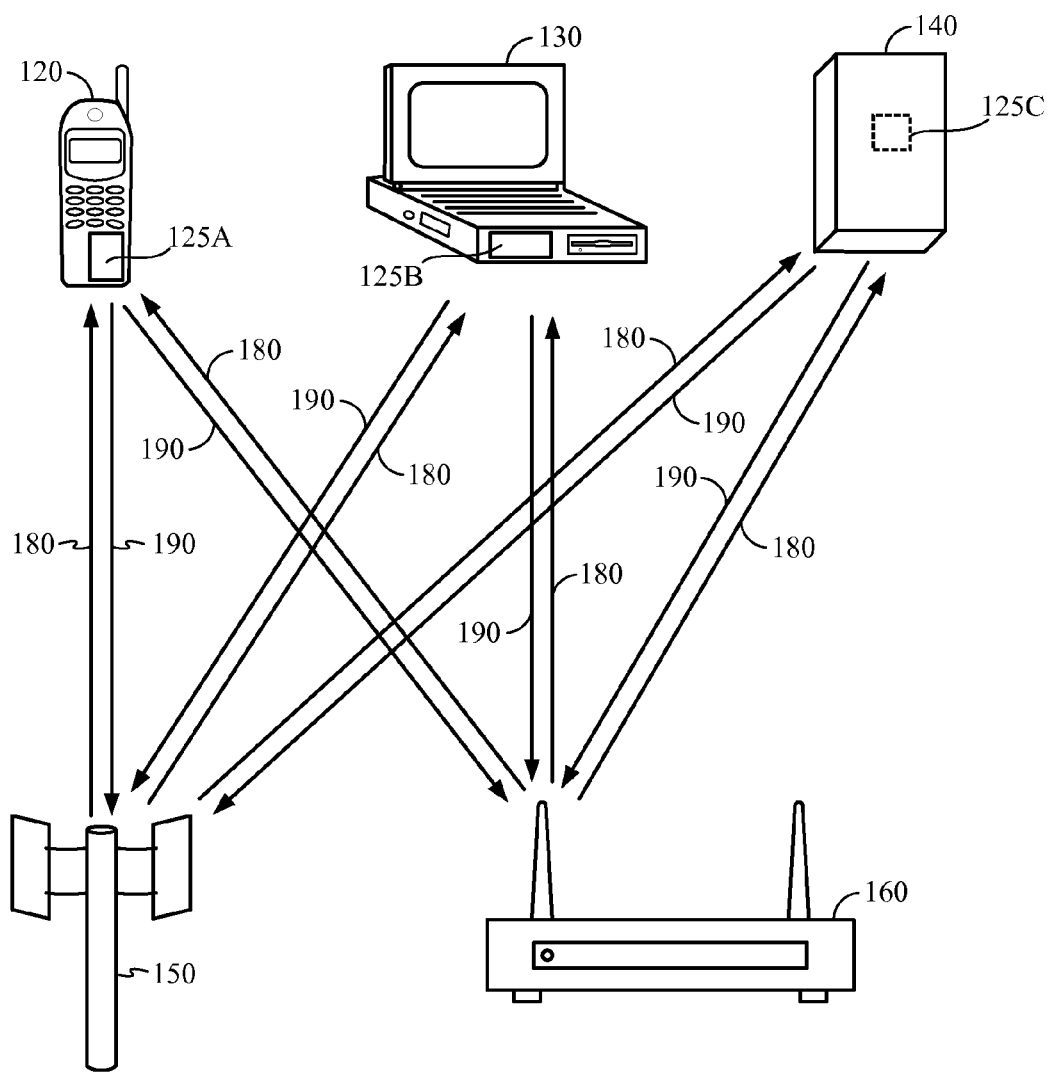
FIG. 1 shows an exemplary wireless communication system in which an embodiment of the disclosure may be advantageously employed.

FIG. 1 shows an exemplary wireless communication system 100 in which an embodiment of the disclosure may be advantageously employed. For purposes of illustration, FIG. 1 shows three remote units 120, 130, and 140 and two base stations 150 and 160. It will be recognized that wireless communication systems may have many more remote units and base stations. Remote units 120, 130, and 140 include improved semiconductor die packages 125A, 125B, and 125C, respectively, which implement embodiments discussed further below. FIG. 1 shows forward link signals 180 from the base stations 150 and 160 and the remote units 120, 130, and 140 and reverse link signals 190 from the remote units 120, 130, and 140 to base stations 150 and 160.

In FIG. 1, remote unit 120 is shown as a mobile telephone, remote unit 130 is shown as a portable computer, and remote unit 140 is shown as a computer in a wireless local loop system. For example, the remote units may be mobile phones, hand-held personal communication systems (PCS) units, portable data units such as personal data assistants, GPS enabled devices, navigation devices, set top boxes, media players, such as music players, video players, and entertainment units, fixed location data units such as meter reading equipment, or any other device that stores or retrieves data or computer instructions, or any combination thereof. Although FIG. 1 illustrates remote units according to the teachings of the disclosure, the disclosure is not limited to these exemplary illustrated units. The disclosure may be suitably employed in any device which includes a NoC.

Figure 2:
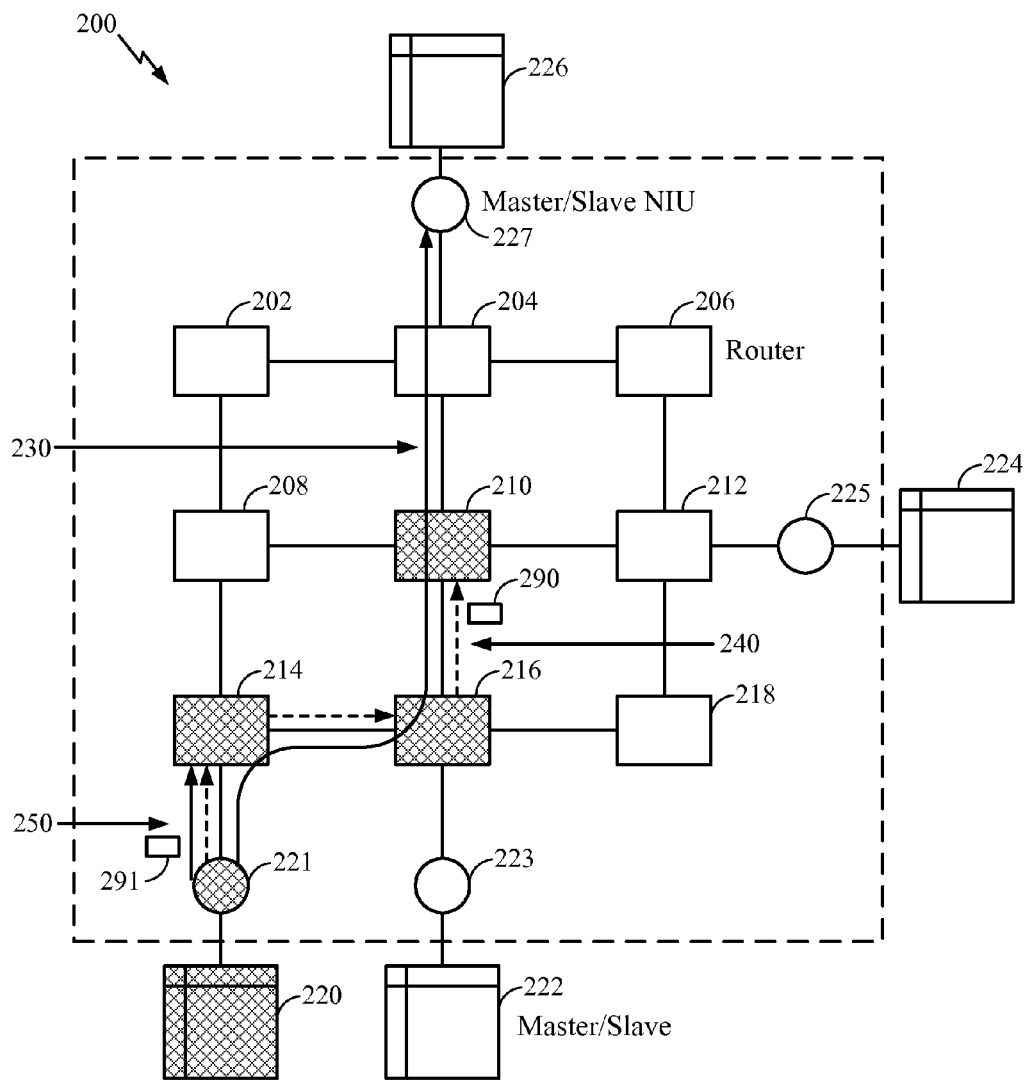
FIG. 2 shows an exemplary NoC fabric adapted according to one embodiment.

FIG. 2 shows an exemplary NoC fabric 200 adapted according to one embodiment. The NoC fabric 200 includes routers 202, 204, 206, 208, 210, 212, 214, 216, 218. Master/slave devices 220, 222, 224, 226 communicate using the NoC fabric 200. Specifically, each of the master/slave devices 220, 222, 224, 226 has a respective network interface unit (NIU) 221, 223, 225, 227 that sends and/or receives messages in the NoC via the routers 202, 204, 206, 208, 210, 212, 214, 216, 218. Each of the master/slave devices 220, 222, 224, 226 may act as either a master device, a slave device or both. Examples of master devices include processors, and examples of slave devices include memories, though such examples are not exhaustive. While not shown herein, it is understood that the NoC fabric 200 may also include other components such as width converters, clock domain converters, and the like.

A particular route to be taken by data flit 291 and a power flit 290 is shown as a route 230. FIG. 2 is a snapshot illustration that shows the progress of the power flit 290 as item 240 and the progress of the data flit 291 as item 250 at a particular, arbitrary point in time. It is understood that the power flit 290 and the data flit 291 will eventually traverse route 230, after being sent from the device 220, to be received successfully at the device 226. It is also understood that the scope of embodiments is not limited to the route 230, and various embodiments are generally applicable to networks with any number of routers and sending/receiving devices. Example techniques for building and sending the power flit 290 are explained in more detail below.

The power flit of this example is the smallest unit of data that can be transferred in one transmission cycle between two or more NoC components. In this example, the power flit 290 is smaller than a typical data flit and includes only a header, where data can be broken into blocks of 'n' bits, and where 'n' is dependent on the implementation and can be any integer value. In one example, the data is broken into blocks of thirty-two bits, and the header includes thirty-two or sixty-four bits, though the header can be any number of bits depending on the implementation. However, various embodiments are not limited to blocks of thirty-two or sixty-four bits. The various NoC components receiving the power flit 290 identify the power flit 290 by a specific 'packet type' field value. The source address in the power flit 290 is the address of the Master/Slave block that intends to send a request/response over the NoC (in this example, device 220). The destination address is the address of the Slave/Master block that receives the request/response (in this example, device 226). The path 230 taken by the power flit 290 is the same as that taken by the data flit 291.

Continuing with the example, the device 220 signals to its NIU 221 that a request/response is to be sent. The signaling may include, for example, asserting a "valid" or other signal, depending on the protocol followed. In response to the signaling, the NIU 229 extracts the destination from the data that will be formed into the data flit 291 and sends the power flit 290 in the same clock cycle, where the power flit 290 includes the extracted destination. Each NoC component on the path of the power flit (e.g., routers 202, 204, 206, 208, 210, 212, 214, 216, 218, width converters, clock domain converters) may be gated on if it receives the power flit 290. The newly gated on component transfers the power flit 290 to the next component in the path. In this example, routers 214, 216, 210, 204, and NIUs 221, 227 will be gated on.

If a given component is already gated on, such component simply transfers the power flit 290 without changing a gating status. The receiving Master/Slave NIU 227 is gated on and terminates the power flit 290. Thus, by preceding the actual data flit 291 (e.g., a request or response) by a number of clock cycles, the power flit 290 absorbs some or all of the latency caused by gating the NoC components on. The amount of latency absorbed by the power flit 290 may depend on a number of factors, such as the latency of the NIU, traffic patterns, and the like.

Some embodiments may include techniques to avoid sending a power flit with every request/response. In one example embodiment, each NIU keeps track of the destinations to which it sends power flits. Each NIU may employ, e.g., single bit registers to keep track of its power flits. When a power flit is sent to a specific destination the corresponding bit for that destination in the particular NIU is set to 1. Power flits are sent only when the status bits are 0. When a given NIU is gated off its power flit status registers are reset to 0. In some embodiments, a return flit can be sent back from a destination to an NIU telling the NIU to set a particular register to 0.

Additionally or alternatively, a countdown timer may be set when a power flit is sent to a destination, and subsequent flits are not sent to the destination until the timer times out. Such technique may improve or optimize the number of power flits sent by ensuring that power flits are not sent repeatedly with each request/response. Instead, a given NIU sends a power flit only when a new path is likely to be encountered. Of course, the embodiments are not limited to this specific use of 0 and 1.

Some routers have separate queues that can be multiplexed onto an output channel. Each of the queues inside a router can be considered a Virtual Channel (VC), where a single physical channel is split up into multiple VCs. Some embodiments extend the use of power flits to NoCs with (VCs). In such embodiments, power flits are sent on the same VCs as their respective request/response data flits. A power flit can be sent on a particular VC using control bits in the NoC header to indicate use of the particular VC.

A highly granular level of independent clock gating can be achieved with the power flit in some embodiments. For instance, in a block such as a router that has multiple input and output ports, the power flit can gate on only those input and output ports used to transfer the data flit. Thus, some parts of the router may remain off even when a data flit is transferred. Such an embodiment may allow for power savings because a larger fraction of the hardware is gated off for a greater period of time than in some conventional gating solutions.

Furthermore, the power flit can be used to clock gate the slave devices more effectively and efficiently than conventional systems. Usually, slaves only respond to requests from masters; hence in the absence of such requests slaves can be gated off. In various embodiments, the NIU associated with a slave gates on the slave after receiving the power flit and before the response/request actually arrives. Such approach may be preferable over other techniques, such as using external control to manage slave gating (which usually involves high area overhead and lowers power savings) or waiting for requests to reach the slave to turn it on (which usually involves higher latency).

Figure 3:
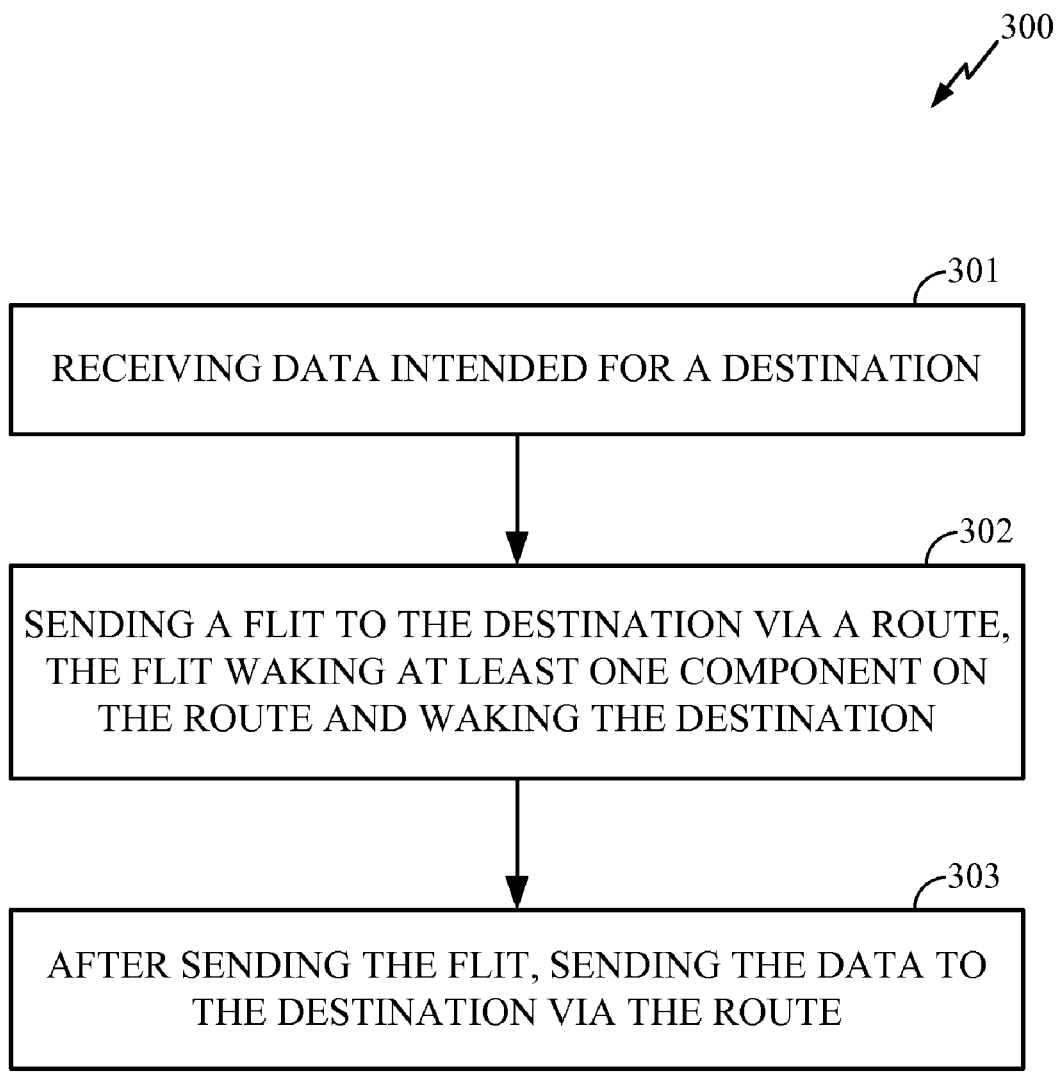
FIG. 3 is an illustration of an exemplary process adapted according to one embodiment.

FIG. 3 is an illustration of an exemplary process 300 adapted according to one embodiment. The process 300 may be performed, for example, by the NoC fabric of a semiconductor chip or chip package or by components in a network other than a NoC.

In block 301, data is received, where the data is intended for a destination. For example, in FIG. 2, the NIU 221 receives a response/request from the master/slave 220 intended for master/slave 226.

In block 302, a power flit is sent to the destination via a route. In one example, the NIU 221 extracts destination data from the response/request, forms the power flit with the destination data and with source data, and sends the power flit along the route. In some embodiments, the power flit may also include other control bits in the header, such as a packet type indicator, a VC indicator, and/or the like. The power flit causes components along the route to wake up, where waking may include resuming the clock supply to the components. In some embodiments, the power flit is sent in the same clock cycle as the response/request is received by the NIU. In some embodiments, the power flit is sent using a VC that is intended for the data as well.

In block 303, a data flit is sent to the destination via the route. In the example of FIG. 2, the NIU 221 sends the response/request along the route after the power flit is sent. The power flit has awakened components along the route so the response/request sees little latency from gating.

The scope of embodiments is not limited to the exact process shown in FIG. 3. Other embodiments may add, omit, rearrange, or modify actions. For instance, some embodiments may keep track of destinations to which power flits have been sent and not repeat sending a power flit to the destination for one or more subsequent response/requests. Also, some embodiments may be implemented by sending multiple flits, e.g., in a scenario wherein some contents that are necessary to do clock gating cannot be accommodated in a single flit.

Various embodiments include advantages over conventional solutions. As mentioned above, various embodiments can provide for a high degree of granularity in hardware gating, even while enjoying low latency for data. Also, greater power savings can result from the high degree of granularity in hardware gating.

The methodologies described herein may be implemented by various components depending upon the application. For example, these methodologies may be implemented in hardware, firmware, software, or any combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory and executed by a processor unit. Memory may be implemented within the processor unit or external to the processor unit. As used herein the term "memory" refers to any type of long term, short term, volatile, nonvolatile, or other memory and is not to be limited to any particular type of memory or number of memories, or type of media upon which memory is stored.

If implemented in firmware and/or software, the functions may be stored as one or more instructions or code on a computer-readable medium. Examples include computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

In addition to storage on computer readable medium, instructions and/or data may be provided as signals on transmission media included in a communication apparatus. For example, a communication apparatus may include a transceiver having signals indicative of instructions and data. The instructions and data are configured to cause one or more processors to implement the functions outlined in the claims.

Moreover, the previous description of the disclosed implementations is provided to enable any person skilled in the art to make or use the present disclosure. Various modifications to these implementations will be readily apparent to those skilled in the art, and the generic principles defined herein may be applied to other implementations without departing from the spirit or scope of the disclosure. Thus, the present disclosure is not intended to be limited to the features shown herein but is to be accorded the widest scope consistent with the principles and novel features disclosed herein.

Although the present disclosure and its advantages have been described in detail, it should be understood that various changes, substitutions and alterations can be made herein without departing from the technology of the disclosure as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure, processes, machines, manufacture, compositions of matter, means, methods, or steps, presently existing or later to be developed that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

What is claimed is:

1. A method comprising:
   identifying a destination of a transaction;
   generating a power flit configured to wake at least one component along a route to the destination;
   sending the power flit along the route to the destination before sending a data flit, the power flit waking the at least one component on the route;
   indicating in a register that the power flit has been sent to the destination; and
   indicating in the register that subsequent power flits may be sent to the destination responsive to one or more of:
   receipt of a return flit from the destination; and
   countdown timer.

2. The method of claim 1 in which the power flit comprises:
   a header indicating the destination and a source of the received data.

3. The method of claim 1 in which sending the power flit comprises:
   extracting destination data from the received data;
   forming the power flit with the destination data; and
   transmitting the power flit along the route.

4. The method of claim 1 performed in a network within a semiconductor chip.

5. The method of claim 4 in which the semiconductor chip is incorporated into a device selected from a group consisting of a music player, a video player, an entertainment unit, a navigation device, a communications device, a personal digital assistant (PDA), a fixed location data unit, and a computer.

6. The method of claim 1, in which waking the at least one component comprises gating on a portion of the at least one component.

7. The method of claim 1 in which sending the power flit includes sending the power flit on a first virtual channel to the exclusion of a second virtual channel.

8. The method of claim 1 further comprising:
checking the register; and
in response to the indication in the register, not sending at least one subsequent power flit to the destination.

9. The method of claim 1 further including waking the destination by the power flit.

10. A system comprising:
means for receiving data intended for a destination;
means for sending a power flit to the destination via a route, the power flit configured to wake components on the route;
means for sending the data as a data flit to the destination via the route after sending the power flit;
means for indicating in a register that the power flit has been sent to the destination; and
means for indicating in the register that subsequent power flits may be sent to the destination responsive to one or more of:
receipt of a return flit from the destination; and
a countdown timer.

11. The system of claim 10 in which the power flit comprises:
a header indicating the destination and a source of the received data.

12. The system of claim 10 in which the means for sending the power flit comprises:
means for extracting destination data from the received data;
means for forming the power flit using the destination data; and
means for transmitting the power flit along the route.

13. The system of claim 10 comprising a network within a semiconductor chip.

14. A computer program product having a non-transitory computer readable medium recording computer program logic, the computer program product comprising:
code to receive data intended for a destination;
code to send a power flit to the destination via a route, the power flit configured to wake at least one component on the route;
code to send the data as a data flit to the destination via the route after sending the power flit;
code to indicate in a register that the power flit has been sent to the destination; and
code to indicate in the register that subsequent power flits may be sent to the destination responsive to one or more of:
receipt of a return flit from the destination; and
a countdown timer.

15. The computer program product of claim 14 in which the power flit comprises:
a header indicating the destination and a source of the received data.

16. The computer program product of claim 14 in which the code to send the power flit comprises:
code to extract destination data from the received data;
code to form the power flit using the destination data; and
code to transmit the power flit along the route.

17. The computer program product of claim 14 further comprising:
code to check the register; and
code to not send at least one subsequent power flit to the destination in response to the indication in the register.

18. A system comprising:
a Network Interface Unit (NIU) configured:
to receive data intended for a destination;
to send a power flit to the destination via a route, the power flit configured to wake components on the route;
to send the data as a data flit to the destination via the route after sending the power flit;
to indicate in a register that the power flit has been sent to the destination; and
to indicate in the register that subsequent power flits may be sent to the destination responsive to one or more of:
receipt of a return flit from the destination; and
a countdown timer.

19. The system of claim 18 in which the NIU is in communication with a network within a semiconductor chip.

20. The system of claim 19 in which the semiconductor chip is incorporated into a device selected from a group consisting of a music player, a video player, an entertainment unit, a navigation device, a communications device, a personal digital assistant (PDA), a fixed location data unit, and a computer.

* * * * *